(12) United States Patent  
Hiller (10) Patent No.: US 9,063,292 B1  
(45) Date of Patent: Jun. 23, 2015

(54) OPTICAL PHASE MODULATOR

(75) Inventor: Nathan D. Hiller, Irvine, CA (US)

(73) Assignee: THE BOEING COMPANY, Chicago, IL (US)

( * ) Notice: Subject to any disclaimer, the term of this patent is extended or adjusted under 35 U.S.C. 154(b) by 508 days.

(21) Appl. No.: 13/347,660

(22) Filed: Jan. 10, 2012

(51) Int. Cl.
- *G02F 1/035* (2006.01)
- *G02B 6/293* (2006.01)
- *G02F 1/21* (2006.01)

(52) U.S. Cl.
CPC .......... *G02B 6/2935* (2013.01); *G02B 6/29352* (2013.01); *G02F 2001/212* (2013.01)

(58) Field of Classification Search
CPC .................................................... G02B 6/2935
See application file for complete search history.

(56) References Cited

U.S. PATENT DOCUMENTS 5,870,512 A * 2/1999 Koch et al. ....................... 385/14
6,169,824 B1 * 1/2001 Sigogne et al. .................... 385/3

OTHER PUBLICATIONS

Encyclopedia of Laser Physics and Technology: www.rp-photonics.com/phase_modulators.html, access date Jun. 13, 2012.
Fundamentals of Photonics, Saleh and Tech, 1991, p. 843.
Y. Miyake, J. Y. Kim, Y. Shiraki, and S. Fukatsu, "Absence of stark shift in strained Si Ge /Si type-I quantum wells", Appl. Phys.Lett., vol. 68, No. 15, pp. 2097-2099, 1996.
Q. Qasaimeh and P. Bhattacharya, "SiGe-Si quantum-well electroabsorption modulators", IEEE Photonics Technology Letters, vol. 10, No. 6, Jun. 1998, pp. 807-809.
R. A. Soref and J. P. Larenzo, "All-silicon active and passive guidedwave components for = 1.3 and 1.6μm", IEEE J. Quantum Electron., vol. QE-22, No. 6, Jun. 1986, pp. 873-879.
Reed, G.T., Silicon Photonics: An Introduction, John Wiley and Sons, Chapter 4, 2004.
G. T. Reed and A. P. Knights, Silicon Photonics. San Francisco, CA, John Wiley and Sons, Chapter 6, 2004.
Soref, R.A., and Bennett, B.R., "Electrooptical Effects in Silicon", IEEE Journal of Quantum Electronics, vol. QE-23, No. 1, Jan. 1987.
Almeida, V. R., et al., "All-optical switching on a silicon chip", Opt. Let., V. 29, No. 24, Dec. 2004, pp. 2867-2869.
N. D. Sankey, D. F. Prelewitz, and T. G. Brown, "All-optical switching in a nonlinear periodic-waveguide structure", Appl. Phys. Lett., vol. 60, No. 12, Mar. 1992, pp. 1427-1429.
R. Normandin, D. C. Houghton, and M. Simard-Normandin, "All-optical, silicon based, fiber optic modulator using a near cutoff region", Can. J. Phys. 67, 412 (1989) pp. 412-419.
G. Cocorullo, F. G. Della Corte, R. De Rosa, I. Rendina, A. Rubino, and E. Terzini, "Fast infrared light modulation in a-Si:H microdevices for fiber-to-the-home applications", J. Non-Cryst. Solids 266-269, 1247 (2000).

(Continued)

*Primary Examiner* — Uyen Chau N Le
*Assistant Examiner* — Chad Smith
(74) *Attorney, Agent, or Firm* — Ameh IP; Lowell Campbell; Elahe Toosi (57) ABSTRACT

An optical phase modulator and modulation method is disclosed. An optical splitter diverts a portion of an input light signal into at least one diverted light signal, and at least one optical amplifier amplifies the at least one diverted light signal to provide at least one amplified light signal. At least one static phase shifter statically phase shifts the at least one amplified light signal to provide at least one phase-shifted diverted light signal, and an optical combiner combines the input light signal with the at least one phase-shifted diverted light signal to provide a phase-shifted combined light signal.

20 Claims, 4 Drawing Sheets

(56) References Cited

OTHER PUBLICATIONS

H. K. Tsang, C. S. Wong, T. K. Liang, I. E. Day, S. W. Roberts, A. Harpin, J. Drake, and M. Asghari, "Optical dispersion, two-photon absorption and self-phase modulation in silicon waveguides at 1.5μm wavelength", Appl. Phys. Lett. 80, 416 (2002).

F. Z. Henari, K. Morgenstern, W. J. Blau, V. A. Karavanskii, and V. S. Dneprovskii, "Third-order optical nonlinearity and all-optical switching in porous silicon", Appl. Phys. Lett. 67, 323 (1995).

R. A. Soref and Brian R. Bennet, "Kramers-Kronig analysis of electro-optical switching in silicon", Proc. SPIE, vol. 704 pp. 32-37, 1986.

R. A. Soref and J. P. Lorenzo, "Light by light modulation in silicon-on-insulator waveguides", Integrated and guided-wave optics : summaries, vol. 4 of 1989 OSA Technical Digest Series (Optical Society of America, Washington, D.C., 1989), p. 86.

Lee, C.H., Picosecond Optoelectronic Devices (Academic, San Diego, Calif., 1984), Chapter 5.

S. W. Leonard, H. M. van Driel, J. Schilling, and R. B. Wehrspohn, in Quantum Electronics and Laser Science (QELS), Postconference Digest vol. 57 of OSA Trends in Optics and Photonics Series (Optical Society of America, Washington, D.C., 2001), p. 159.

\* cited by examiner

OPTICAL PHASE MODULATOR

FIELD

Embodiments of the present disclosure relate generally to electro-optics. More particularly, embodiments of the present disclosure relate to electro-optic devices.

BACKGROUND

Optical phase modulators have numerous applications such as: active mode locking of a laser, stabilization of a laser frequency, wavelength tuning of a single-frequency laser, enabling a core technology for interferometers, generating frequency combs for some metrology applications, or other applications. Dynamically changing a phase of light can be achieved by, for example, dynamically changing a length of a light path (e.g., stretching a waveguide), or by dynamically changing a refractive index of a medium in which light travels. The refractive index of a medium can be changed by, electric field, magnetic field, stress field, temperature, quantum-confined Stark effect, free-carrier plasma dispersion, or other means. However, dynamically changing a length of the light path is a mechanical process, and therefore it is energy inefficient and slow. An ability to dynamically change the refractive index in some materials is limited and may be difficult.

SUMMARY

An optical phase modulator and modulation methods are disclosed. An optical splitter diverts at least one portion of an input light signal into at least one diverted light signal, and at least one optical amplifier amplifies the diverted light signal to provide at least one amplified light signal. At least one static phase shifter statically phase shifts the amplified light signal to provide at least one phase-shifted diverted light signal, and an optical combiner combines the input light signal with the phase-shifted diverted light signal to provide a phase-shifted combined light signal.

In this manner, issues associated with non-optimal processes of current optical phase modulators are solved. These non-optimal processes may comprise, for example but without limitation, an energy inefficient and slow process of dynamically changing the path length of light, a limited ability to dynamically change a refractive index in some materials, or other non-optimal process.

In an embodiment, an optical phase modulator comprises an optical splitter, at least one optical amplifier, at least one static phase shifter, and an optical combiner. The optical splitter is operable to divert at least one portion of an input light signal into at least one diverted light signal. The at least one optical amplifier is operable to amplify the at least one diverted light signal to provide at least one amplified light signal. The static phase shifter is operable to statically phase shift the at least one amplified light signal to provide at least one phase-shifted diverted light signal. The optical combiner is operable to combine the input light signal with the at least one phase-shifted diverted light signal to provide a phase-shifted combined light signal.

In another embodiment, a method for dynamically phase shifting a light signal optically diverts at least one portion of an input light signal into at least one diverted light signal. The method further amplifies the at least one diverted light signal to provide at least one amplified light signal, and statically phase shifts the at least one amplified light signal to provide at least one phase-shifted light signal. The method further combines the input light signal with the at least one phase-shifted light signal to provide a combined phase-shifted light signal.

In a further embodiment, a method for providing an optical phase modulator provides an optical splitter operable to divert at least one portion of an input light signal into at least one diverted light signal. The method further provides at least one optical amplifier operable to amplify the at least one diverted light signal to provide at least one amplified light signal. The method further provides at least one static phase shifter operable to statically phase shift the at least one amplified light signal to provide at least one phase-shifted light signal. The method further provides an optical combiner operable to combine the input light signal with the at least one phase-shifted light signal to provide a combined phase-shifted light signal.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to optical sources, optical properties, phase modulation techniques, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, optical modulation. Embodiments of the disclosure, however, are not limited to such optical modulation applications, and the techniques described herein may also be utilized in other applications. For example but without limitation, embodiments may be applicable to microwaves, radio waves, sound waves, and other signals.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

To dynamically phase shift light, most optical phase modulators modify a medium in which light propagates. In contrast, embodiments of the disclosure provide a system and methods for phase modulating a light signal that dynamically phase shifts light by directly modifying the light as explained below.

Figure 1:
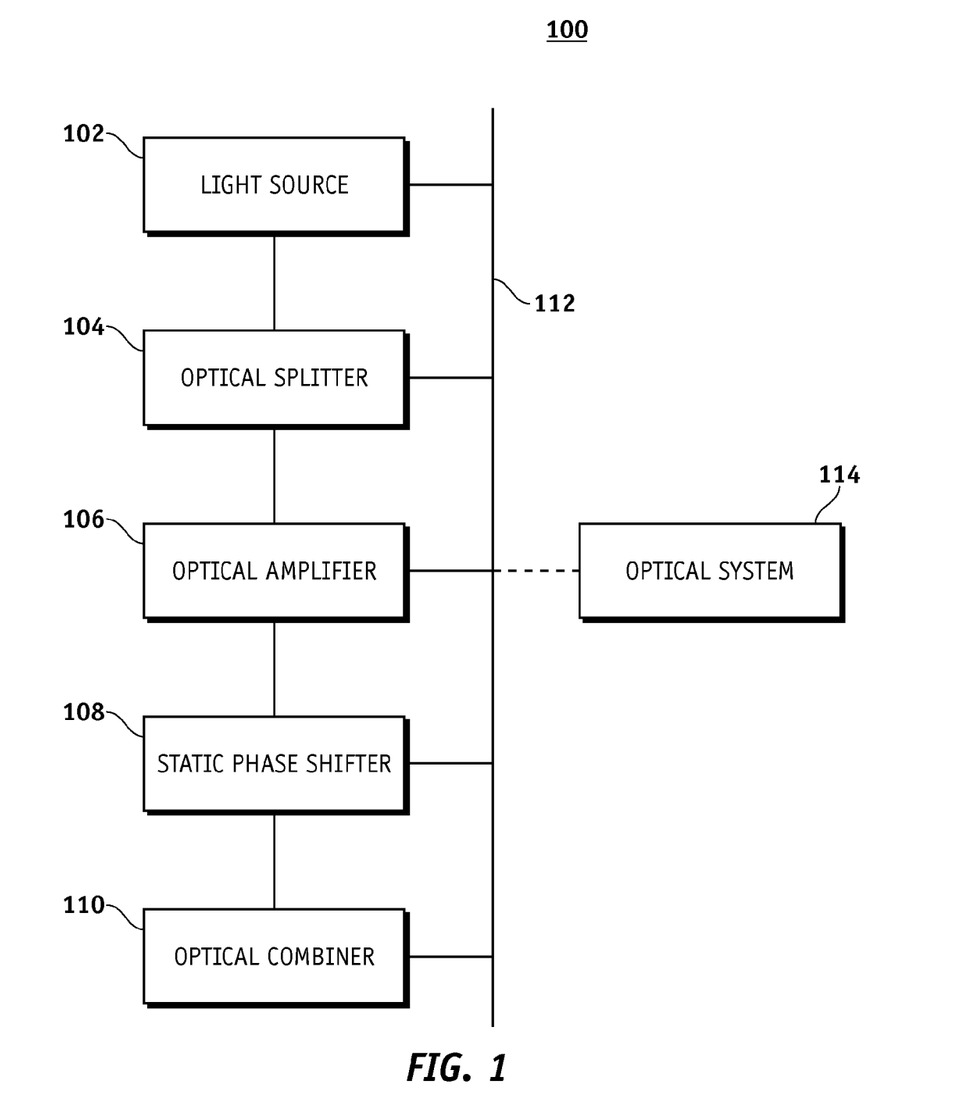
FIG. 1 is an illustration of an exemplary functional block diagram of a phase modulator according to an embodiment of the disclosure.

FIG. 1 is an illustration of an exemplary functional block diagram of an optical phase modulator 100 (system 100) according to an embodiment of the disclosure. The system 100 dynamically phase shifts light by directly modifying the light. This direct modification of light is accomplished by diverting an input light signal, amplifying the diverted light signal, statically phase shifting the diverted amplified light signal, and then recombining the diverted phase shifted amplified light signal with the input light signal.

The system 100 may comprise a light source 102, an optical splitter 104, at least one optical amplifier 106, at least one static phase shifter 108, and an optical combiner 110. A practical system 100 may comprise any number of processor modules, any number of memory modules, and any number of other modules. The illustrated system 100 depicts a simple embodiment for ease of description. These and other elements of the system 100 are interconnected together, allowing communication between the various elements of system 100. The system 100 may be coupled to an optical system 114 for a variety of applications discussed below.

In one embodiment, these and other elements of the system 100 may be interconnected together via a communication link 112. Those of skill in the art will understand that the various illustrative blocks, modules, circuits, and processing logic described in connection with the embodiments disclosed herein may be implemented in hardware, computer-readable software, firmware, or any practical combination thereof.

To illustrate clearly this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure. System 100 is described below in conjunction with FIG. 2.

The light source 102 is operable to generate an input light signal 202 (FIG. 2) for the system 100. The light source 102 may comprise, for example but without limitation, a laser, or other coherent wave source.

The optical splitter 104 is operable to divert a portion of the input light signal 202 into at least one diverted light signal 206. At least one waveguide 218 may be used to guide the at least one diverted light signal 206 along at least one predetermined path.

The optical amplifier 106 (208 in FIG. 2) is operable to amplify the diverted light signal 206 to provide at least one amplified light signal 210. The optical amplifier 106 may be further operable to be set to a specified amplification.

The static phase shifter 108 (212 in FIG. 2) is operable to statically phase shift the amplified light signal 210 to provide at least one phase-shifted diverted light signal 214. The static phase shifter 108 may be further operable to be set to a specified static phase shift.

The optical combiner 110 is operable to combine the input light signal 202 with the at least one phase-shifted diverted light signal 214 to provide a phase-shifted combined light signal 216.

The optical system 114 may be coupled to the system 100 for a variety of applications. For example but without limitation, the system 100 may be used in the optical system 114 for: an optical computation system, a laser, an interferometer, a frequency comb (e.g., for a metrology application), an optical communication system (e.g., for encoding data), or other application. Further, for example but without limitation, the system 100 may be used for a laser in the optical system 114 for: active mode locking of a laser, stabilization of a laser frequency, wavelength tuning of a single-frequency laser, or other laser application. Additionally, for example but without limitation, the system 100 may be used in the optical system 114 for an optical computation system as: a computation block, an amplifier, or other computation element.

Figure 2:
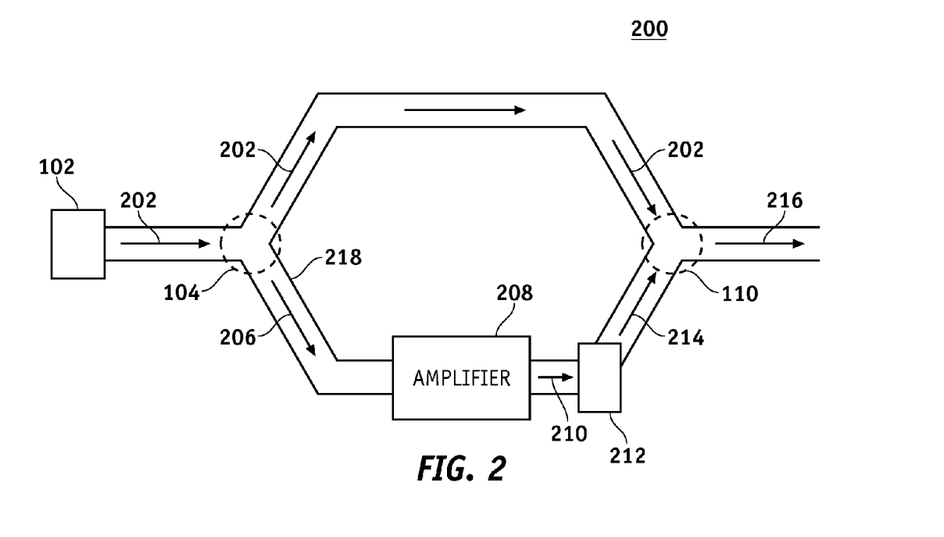
FIG. 2 is an illustration of an exemplary optical phase modulation showing a light signal flow according to an embodiment of the disclosure.

FIG. 2 is an illustration of an exemplary optical phase modulator 200 (system 200) showing a light signal flow according to an embodiment of the disclosure. The system 200 may have functions, material, and structures that are similar to the embodiments shown in FIG. 1. Therefore, common features, functions, and elements may not be redundantly described here. System 200 is described below in conjunction with FIG. 1.

The input light signal 202 is generated by the light source 102. A portion of the input light signal 202 is then diverted by the optical splitter 104 into at least one waveguide to form the diverted light signal 206. The diverted light signal 206 is amplified by an optical amplifier 208 (106 in FIG. 1) into an amplified light signal 210. The amplified light signal 210 is statically phase shifted by a static phase shifter 212 into the phase-shifted light signal 214. The phase-shifted light signal 214 and the input light signal 202 are then combined by the optical combiner 110 to provide the combined phase-shifted light signal 216 at an output of the system 200.

Figure 3:
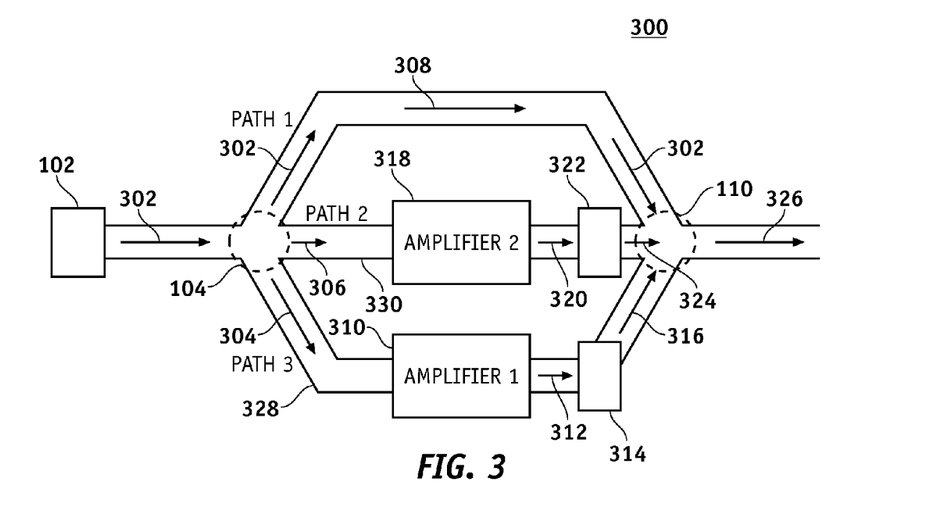
FIG. 3 is an illustration of an exemplary optical phase modulation showing a light signal flow according to an embodiment of the disclosure.

FIG. 3 is an illustration of an exemplary optical phase modulator 300 (system 300) showing a light signal flow according to an embodiment of the disclosure according to an embodiment of the disclosure. The system 300 may have functions, material, and structures that are similar to the embodiments shown in FIG. 1. Therefore, common features, functions, and elements may not be redundantly described here. System 300 is described below in conjunction with FIG. 2.

An input light signal 302 is generated by the light source 102. A first portion and a second portion of the input light signal 302 are diverted by the optical splitter 104 into two waveguides such as a first waveguide 328 and a second waveguide 330 to form a first diverted light signal 304, and a second diverted light signal 306 respectively. The first diverted light signal 304 is amplified by a first optical amplifier 310 into a first amplified light signal 312. The first amplified light signal 312 is statically phase shifted by a static phase shifter 314 into a first phase-shifted light signal 316. The second diverted light signal 306 is amplified by a second optical amplifier 318 into a second amplified light signal 320. The second amplified light signal 320 is statically phase shifted by a second static phase shifter 322 into a second phase-shifted light signal 324.

The first phase-shifted light signal 316, the second phase-shifted light signal 324, and the input light signal 302 are combined by the optical combiner 110 to provide a combined phase-shifted light signal 326 at an output of the system 300.

Diverted light signals may be guided along respective predetermined paths using respective waveguides. For example, in the embodiment shown in FIG. 3, the first diverted light signal 304, and the second diverted light signal 306 are split between the first waveguide 328 (along path 3) and the second waveguide 330 (along path 2). Path 2 has a length that is equal to path 1 (or a multiple of $2\pi$). Path 3 has a length that is about $+/-2.1$ radians different than path 2. By adjusting an amplification of each of the optical amplifiers 318/310 on each of the path 2 and the path 3 respectively, a phase of the combined phase-shifted light signal 326 can be tuned to, for example but without limitation, between about 0 and about 1.04 radians, or other suitable phase shift. Efficiency may drop off beyond 1.04 radians. Concurrently, a magnitude of the combined phase-shifted light signal 326 is equal to the input light signal 302. A substantially maximum total power required for the optical amplifiers 318/310 is equal to (an input signal power of the input light signal 302)/(amplifier efficiency).

The second optical amplifier 318 may only be needed to improve maintaining constant output power over using a single optical amplifier. However, if the second optical amplifier 318 is eliminated, the output power may only decrease, for example but without limitation, between about 0% and about 3%. Since such a loss of power may be acceptable for many applications, the second optical amplifier 318 may be removed to simplify the manufacture and operation of the system 300.

To achieve dynamic phase shifts greater than 1.04 radians, a user can increase a static phase shift of the static phase shifter 314 on the path 3 or of the static phase shifter 322 on the path 2 to greater than about $+/-2.1$ radians, however power efficiency may decrease.

In one embodiment, any of the systems 200 through system 300 may be duplicated and combined in series so that a total phase shift of $N \times 1.04$ can result, where N is an integer.

Figure 4:
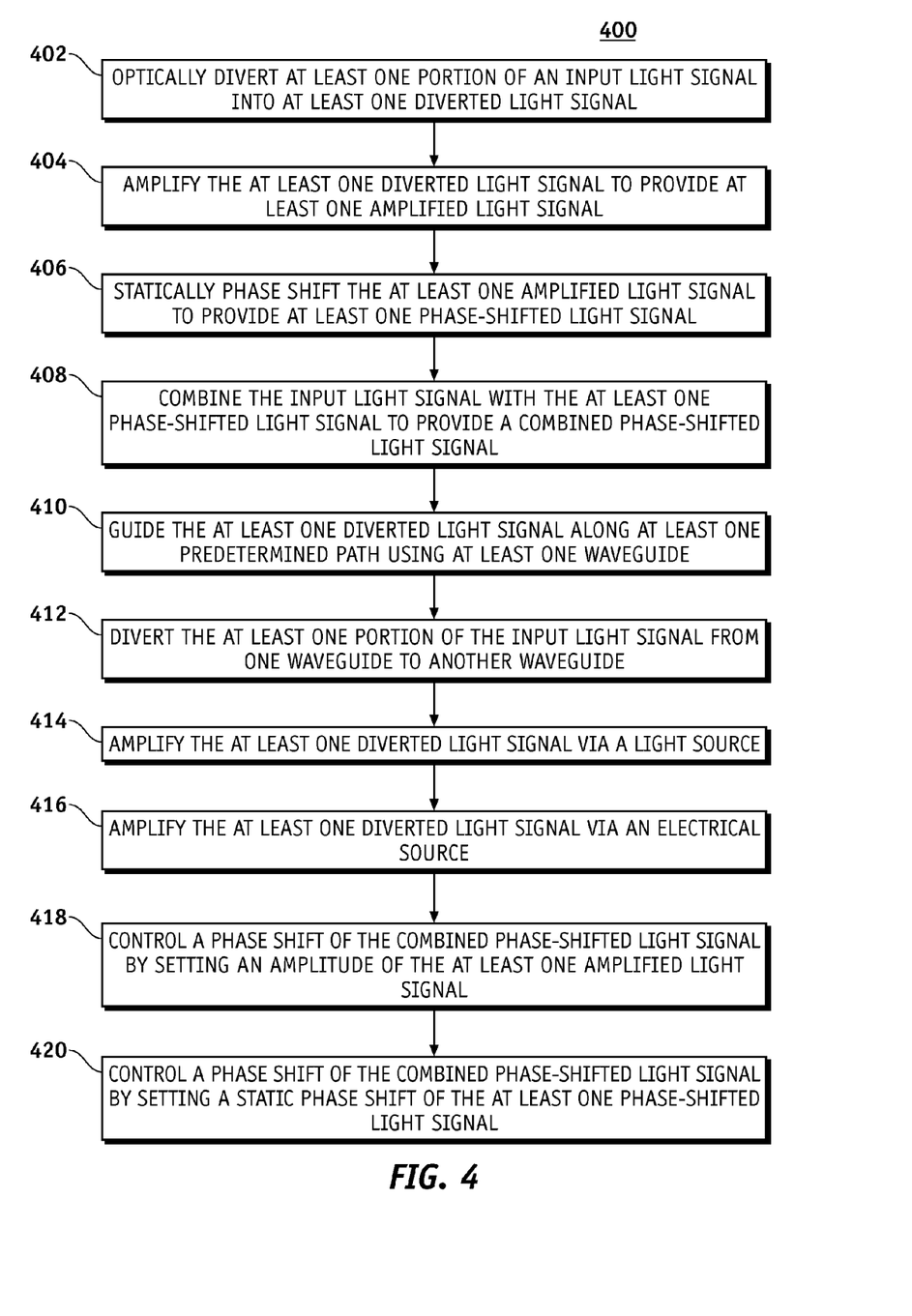
FIG. 4 is an illustration of an exemplary flowchart showing a process for dynamically phase shifting a light signal according to an embodiment of the disclosure.

FIG. 4 is an illustration of an exemplary flowchart showing a process 400 for dynamically phase shifting a light signal according to an embodiment of the disclosure. The various tasks performed in connection with the process 400 may be performed mechanically, by software, hardware, firmware, a computer-readable medium having computer executable instructions for performing the processes, or any combination thereof.

It should be appreciated that process 400 may include any number of additional or alternative tasks, the tasks shown in FIG. 4 need not be performed in the illustrated order, and the process 400 may be incorporated into a more comprehensive procedure or process having additional functionality not described in detail herein. For illustrative purposes, the following description of process 400 may refer to elements mentioned above in connection with FIGS. 1-3.

In practical embodiments, portions of the process 400 may be performed by different elements of the system 100 through 300 such as: the light source 102, the optical splitter 104, the optical amplifier 106/208/310/318, the static phase shifter 108/212/314/322, the optical combiner 110, etc. Process 400 may have functions, material, and structures that are similar to the embodiments shown in FIGS. 1-3. Therefore, common features, functions, and elements may not be redundantly described here.

Process 400 may begin by an optical splitter such as the optical splitter 104 optically diverting at least one portion of an input light signal such as the input light signal 202 into at least one diverted light signal such as the diverted light signal 206 (task 402).

Process 400 may continue by an optical amplifier such as the optical amplifier 208 amplifying the diverted light signal 206 to provide at least one amplified light signal such as the amplified light signal 210 (task 404).

Process 400 may continue by a static phase shifter such as the static phase shifter 212 statically phase shifting the amplified light signal to provide at least one phase-shifted light signal such as the phase-shifted light signal 214 (task 406).

Process 400 may continue by an optical combiner such as the optical combiner 110 combining the input light signal 202 with the phase-shifted light signal 214 to provide a combined phase-shifted light signal such as the combined phase-shifted light signal 216 (task 408).

Process 400 may continue by guiding the diverted light signal 206 along at least one predetermined path using at least one waveguide such as the waveguide 218 (task 410).

Process 400 may continue by diverting the at least one portion of the input light signal 202 from one waveguide such as the first waveguide 328 to another waveguide such as the second waveguide 330 (task 412).

Process 400 may continue by amplifying the diverted light signal 206 via a light source such as the light source 102 (task 414).

Process 400 may continue by the optical amplifier 208 amplifying the diverted light signal 206 via an electrical source (task 416).

Process 400 may continue by controlling a phase shift of the combined phase-shifted light signal 216 by the optical amplifier 208 setting an amplitude of the amplified light signal 210 (task 418).

Process 400 may continue by controlling a phase shift of the combined phase-shifted light signal 216 by the static phase shifter 212 setting a static phase shift of the phase-shifted light signal 214 (task 420).

Figure 5:
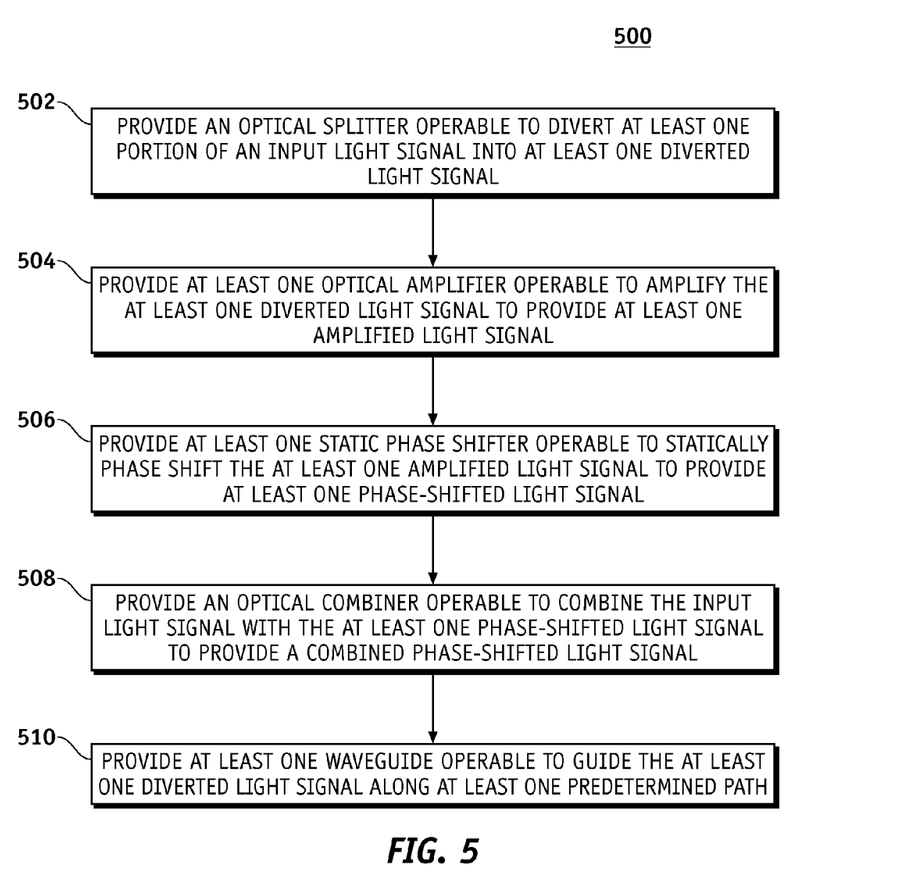
FIG. 5 is an illustration of an exemplary flowchart showing a process for providing a phase modulator according to an embodiment of the disclosure.

FIG. 5 is an illustration of an exemplary flowchart showing a process 500 for providing a phase modulator according to an embodiment of the disclosure. The various tasks performed in connection with process 500 may be performed mechanically, by software, hardware, firmware, a computer-readable medium having computer executable instructions for performing the processes, or any combination thereof. For illustrative purposes, the following description of the process 500 may refer to elements mentioned above in connection with FIGS. 1-3.

It should be appreciated that the process 500 may include any number of additional or alternative tasks, the tasks shown in FIG. 5 need not be performed in the illustrated order, and the process 500 may be incorporated into a more comprehensive procedure or process having additional functionality not described in detail herein. In practical embodiments, portions of the process 500 may be performed by different elements of the system 100 through 300 such as: the light source 102, the optical splitter 104, the optical amplifier 106/208/310/318, the static phase shifter 108/212/314/322, the optical combiner 110, etc. Process 500 may have functions, material, and structures that are similar to the embodiments shown in FIGS. 1-3. Therefore, common features, functions, and elements may not be redundantly described here.

Process 500 may begin by providing an optical splitter such as the optical splitter 104 operable to divert at least one portion of an input light signal such as the input light signal 202 into at least one diverted light signal such as the diverted light signal 206 (task 502).

Process 500 may continue by providing at least one optical amplifier such as the optical amplifier 208 operable to amplify the diverted light signal 206 to provide at least one amplified light signal such as the amplified light signal 210 (task 504).

Process 500 may continue by providing at least one static phase shifter such as the static phase shifter 212 operable to statically phase shift the amplified light signal 210 to provide at least one phase-shifted light signal such as the phase-shifted light signal 214 (task 506).

Process 500 may continue by providing an optical combiner such as the optical combiner 110 operable to combine the input light signal 202 with the phase-shifted light signal 214 to provide a combined phase-shifted light signal such as the combined phase-shifted light signal 216 (task 508).

Process 500 may continue by providing at least one waveguide such as the waveguide 218 operable to guide the at least one diverted light signal along at least one predetermined path (task 510).

In this manner, embodiments of disclosure provide an optical phase modulator that solves non-optimal processes associated with current optical phase modulators are solved. These non-optimal processes may comprise, for example but without limitation, an energy inefficient and slow process of dynamically changing the path length of light, a limited ability to dynamically change the refractive index in some materials, or other non-optimal process.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by a processor module to cause the processor module to perform specified operations. Such instructions, generally referred to as "computer program code" or "program code" (which may be grouped in the form of computer programs or other groupings), when executed, enable optical phase modulation methods of the system 100.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-3 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. An optical phase modulator comprising:
an optical splitter operable to divert at least one portion of an input light signal into at least one diverted light signal;
at least one optical amplifier operable to amplify the at least one diverted light signal to provide at least one amplified light signal;
at least one static phase shifter operable to statically phase shift with a constant shift in phase the at least one amplified light signal to provide at least one phase-shifted diverted light signal; and
an optical combiner operable to combine the input light signal with the at least one phase-shifted diverted light signal to provide a phase-shifted combined light signal at an output of the optical combiner, wherein a magnitude and power of the output is equal to a magnitude and power of the phase-shifted combined light signal at the input light signal, wherein the input light signal traverses a path from the optical splitter to the optical combiner that is unamplified and not phase shifted.

2. The optical phase modulator of claim 1, wherein the at least one optical amplifier comprises at least one of: a light source, and an electrical source.

3. The optical phase modulator of claim 1, wherein a maximum total power of the at least one optical amplifier is equal to an input signal power of the input light signal and proportional to an efficiency of the at least one optical amplifier.

4. The optical phase modulator of claim 1, further comprising at least one waveguide operable to guide the at least one diverted light signal along at least one predetermined path.

5. The optical phase modulator of claim 4, wherein:
the at least one waveguide comprises at least two waveguides; and
the optical splitter is further operable to divert the at least one portion of the input light signal from one of the at least two waveguides to another.

6. The optical phase modulator of claim 5, wherein the at least two waveguides comprise a first waveguide comprising a first waveguide length, and a second waveguide comprising a second waveguide length that is 2.1 radians greater or less than the first waveguide length.

7. The optical phase modulator of claim 1, further comprising a processor operable to modulate a phase shift of the at least one phase-shifted diverted light signal by controlling an amplitude of the at least one amplified light signal, wherein the magnitude and the power of the phase-shifted combined light signal at the output is equal to the magnitude and the power of the input light signal.

8. The optical phase modulator of claim 1, wherein the at least one static phase shifter is further operable to be set to a specified static phase shift.

9. A method for dynamically phase shifting a light signal, the method comprising:
optically diverting at least one portion of an input light signal into at least one diverted light signal through an optical splitter;
amplifying the at least one diverted light signal to provide at least one amplified light signal;
statically phase shifting with a constant shift in phase the at least one amplified light signal to provide at least one phase-shifted light signal; and
combining the input light signal with the at least one phase-shifted light signal to provide a combined phase-shifted light signal at an output of an optical combiner, wherein a magnitude and power of the combined phase-shifted light signal at the output of the optical combiner is equal to a magnitude and power of the input light signal, wherein the input light signal traverses a path from the optical splitter to the optical combiner that is unamplified and not phase shifted.

10. The method of claim 9, further comprising amplifying the at least one diverted light signal via a light source or an electrical source.

11. The method of claim 9, further comprising guiding the at least one diverted light signal along at least one predetermined path using at least one waveguide.

12. The method of claim 11, further comprising diverting the at least one portion of the input light signal from one waveguide to another waveguide.

13. The method of claim 9, further comprising modulating a phase shift of the combined phase-shifted light signal by controlling an amplitude of the at least one amplified light signal, wherein the magnitude and the power of the combined phase-shifted light signal at the output of the optical combiner is equal to the magnitude and the power of the input light signal.

14. The method of claim 9, further comprising controlling a phase shift of the combined phase-shifted light signal by setting a static phase shift of the at least one phase-shifted light signal.

15. A method for providing an optical phase modulator, the method comprising:
providing an optical splitter operable to divert at least one portion of an input light signal into at least one diverted light signal;
providing at least one optical amplifier operable to amplify the at least one diverted light signal to provide at least one amplified light signal;
providing at least one static phase shifter operable to statically phase shift with a constant shift in phase the at least one amplified light signal to provide at least one phase-shifted light signal; and
providing an optical combiner operable to combine the input light signal with the at least one phase-shifted light signal to provide a combined phase-shifted light signal at an output of the optical combiner, wherein a magnitude and power of the combined phase-shifted light signal at the output of the optical combiner is equal to a magnitude and power of the input light signal, wherein the input light signal traverses a path from the optical splitter to the optical combiner that is unamplified and not phase shifted.

16. The method of claim 15, wherein providing at least one optical amplifier comprises providing at least one of: a light source, and an electrical source.

17. The method of claim 15, further comprising providing at least one waveguide operable to guide the at least one diverted light signal along at least one predetermined path.

18. The method of claim 17, wherein providing at least one waveguide comprises providing at least two waveguides, the optical splitter further operable to divert the at least one portion of the input light signal from one of the at least two waveguides to another.

19. The method of claim 15, further comprising providing a processor operable to modulate a phase shift of the at least one phase-shifted light signal by controlling an amplitude of the at least one amplified light signal, wherein the magnitude and the power of the combined phase-shifted light signal at the output of the optical combiner is equal to the magnitude and the power of the input light signal.

20. The method of claim 15, wherein providing the at least one static phase shifter comprises providing the at least one static phase shifter further operable to be set to a specified static phase shift.

* * * * *